United States Patent [19]

Narcisse

[11] Patent Number: 4,675,656
[45] Date of Patent: * Jun. 23, 1987

[54] OUT-OF-RANGE PERSONNEL MONITOR AND ALARM

[76] Inventor: Bernadine O. Narcisse, 10366 Miller Ave., Cupertino, Calif. 95014

[*] Notice: The portion of the term of this patent subsequent to Jun. 3, 2003 has been disclaimed.

[21] Appl. No.: 869,095

[22] Filed: May 30, 1986

Related U.S. Application Data

[63] Continuation-in-part of Ser. No. 590,325, Mar. 16, 1984, Pat. No. 4,593,273.

[51] Int. Cl.4 .............................................. H04Q 7/00
[52] U.S. Cl. ..................................... 340/539; 128/903
[58] Field of Search ......................... 340/539; 128/903

[56] References Cited

U.S. PATENT DOCUMENTS 4,347,501  8/1982  Akerberg ............................ 340/539
4,593,273  6/1986  Narcisse ............................. 340/539

Primary Examiner—Glen R. Swann, III
Assistant Examiner—Thomas J. Mullen, Jr.

[57] ABSTRACT

An out-of-range monitor and alarm system that may be used by a convalescent home or the like to alert an attendant in the home that a supervised person has walked beyond a predetermined prescribed distance. The system includes a base unit that transmits a first signal to a receiver in a mobile unit carried by the supervised person. The receiver includes a threshold circuit that is adjustable to correspond to the prescribed distance and produces a threshold output signal whenever the first signal detected by the receiver drops below the threshold level. In response to the threshold output signal, a transmitter in the mobile unit produces a second signal to a receiver in the base unit, which in turn sounds an alarm indicating that the mobile unit has lost adequate signal strength, as determined by the threshold adjustment, by exceeding the range prescribed for the supervised person. The first and second signals may have equal frequencies if the mobile unit produces an output signal having an identification code. The base unit has decoder for identifying the responsible mobile unit.

17 Claims, 4 Drawing Figures

OUT-OF-RANGE PERSONNEL MONITOR AND ALARM

CROSS-REFERENCE TO RELATED APPLICATION

This is a continuation-in-part of prior copending application Ser. No. 590,325, filed Mar. 16, 1984, now U.S. Pat. No. 4,593,273.

TECHNICAL FIELD

This invention relates generally to alarm systems and particularly to a personnel monitor and alarm system that alerts a base unit in a home, sanitarium, or the like, when a child or ambulatory patient may be straying out of a prescribed range from the base unit.

BACKGROUND ART

Many devices have been developed in an attempt to successfully monitor and detect the passage of persons from an unconfined area of predetermined size. For example, U.S. Pat. No. 3,478,344 to Schwitzgebel et al. describes a behavior supervision system including four spaced base transceivers communicating with mobile transceivers mounted to the belt of each of a plurality of persons to be supervised so that the four base units can pinpoint the location of each mobile unit and sound an alarm if one leaves a predetermined area. Another alarm system is disclosed in U.S. Pat. No. 3,947,832 which describes a miner's helmet containing a radio transmitter that will alarm a base unit whenever the miner enters a danger zone.

An object of the invention, therefore, is to provide a means for supervisory personnel at a base unit to become alerted when supervised personnel carrying a mobile unit leave a prescribed area.

Another object of the invention is to alert supervised persons carrying a mobile unit responsive to a base unit transmitter that they are straying from a predetermined prescribed area.

DISCLOSURE OF INVENTION

Briefly described, the invention disclosed herein includes a small low-powered transmitter and a threshold adjustable receiver in at least one small mobile unit, and a low-power transmitter and a receiver in a single, fixed base unit. The base unit transmits an omnidirectional first signal that is detectable by the receivers in the mobile units. Whenever the threshold level in a mobile unit receiver is adjusted to the point at which it cannot detect that first signal from the base unit, the mobile transmitter becomes activated and emits a second signal that is detected by the base unit receiver. The frequency of the second signal may be different from the frequency of the first signal. Alternatively, the frequency of the second signal may equal the frequency of the first signal, provided a unit identification code is transmitted to distinguish between different transmitting units. The first and second signals are generally frequency independent. The base unit then produces a suitable audible alarm or visual display that indicates to the base unit personnel that a mobile unit has strayed out of the range predetermined by the threshold level adjustment in that mobile unit. If desired, the activated mobile transmitter may also initiate an alarm to warn the straying person carrying the mobile unit.

BEST MODE FOR CARRYING OUT THE INVENTION

Figure 1:
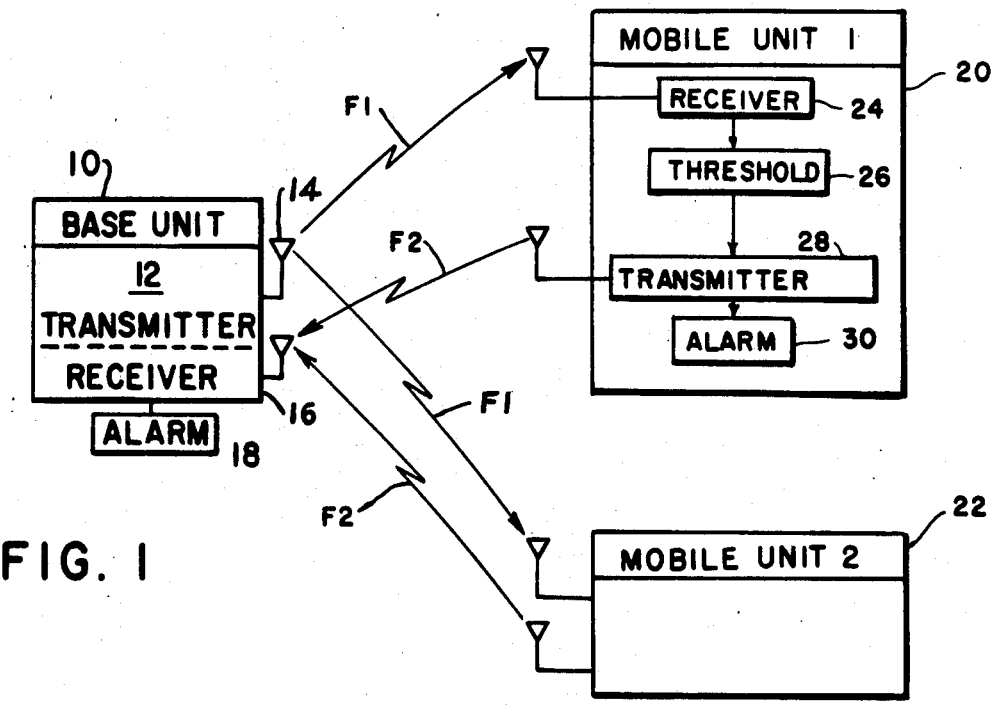
FIG. 1 is a block diagram illustrating a base unit and a plurality of mobile units of the out-of-range monitor and alarm.

With reference to FIG. 1, the invention includes a single, fixed base unit 10 which preferably includes a radio transmitter 12 which transmits from its antenna 14 a very low-power omnidirectional first electromagnetic signal that may have a maximum range from the base unit to a sensitive receiver at a distance of only approximately 800 to 1000 meters. The transmitter 12 produces the first signal at a frequency which preferably is a very low-power, short wave, VHF or UHF radio signal but which, if desired, may be a sonic signal in the ultrasonic range. A frequency of approximately 30 MHz is typical. The first signal may be continuous or intermittent in nature. The first signal may be modulated with a base unit identification code.

The base unit 10 also includes a receiver 16 that is tuned to receive a fixed frequency second electromagnetic signal. The second signal which is received is preferably modulated with an identification code indicative of a particular transmitting unit. The frequency of the second signal is preferably equal to the frequency of the first signal when the transmitted signals contain an identification code. Alternatively, the second signal frequency may be sufficiently separated from the first signal frequency from the transmitter 12 so that the first signal is undetectable by the receiver 16. An audible alarm 18 is coupled to the output of the receiver 16 and is responsive to the second signal detected by the receiver. While not essential, it is preferable that both the first and second signals are modulated with an audible tone as will be subsequently discussed. The alarm 18 may therefore comprise the audible signal modulated on the second frequency, or may be triggered by it to sound a bell or other audible alarm. The base unit may also produce a visual display instead of or in addition to the alarm 18 indicating a particular mobile unit which is transmitting the second signal.

The monitor and alarm system also includes one or more identical mobile units 20 or 22 which may be sufficiently small in size to be strapped to the wrist of a supervised person or may be worn on the belt together with a small power pack. As illustrated in the mobile unit 20, each unit includes a fixed frequency receiver 24 tuned to the frequency of the first signal transmitted by the base unit 10. The receiver output signal, which is preferably an identification code or tone modulated on the first carrier signal, is adjustably controlled by a threshold circuit 26 which generates an output signal only when the detected receiver output signal falls below an amplitude level determined by the adjustment of the threshold circuit. Thus, the threshold circuit 26 may be adjusted to produce an output signal whenever the mobile unit is moved out of an area within which the base unit transmitted first electromagnetic signal may be detected. Stated differently, the threshold circuit 26 on any mobile unit may be adjusted to produce an output signal corresponding to some predetermined prescribed distance from the base unit.

The threshold circuit 26 in each mobile unit controls the operation of a transmitter 28 which transmits an output second electromagnetic signal only upon receiving an output signal from the threshold circuit 26. Thus, whenever a mobile unit leaves an area prescribed by the setting of the threshold circuit 26, the transmitter 28 produces the second electromagnetic signal which is detected by the based unit 10 to sound the alarm 18 therein. If desired, the mobile unit transmitters may also include an audible alarm 30, preferably producing an output signal at the modulated tone frequency of the transmitted second signal for alerting the mobile unit wearer that the prescribed range has been exceeded.

Figure 2:
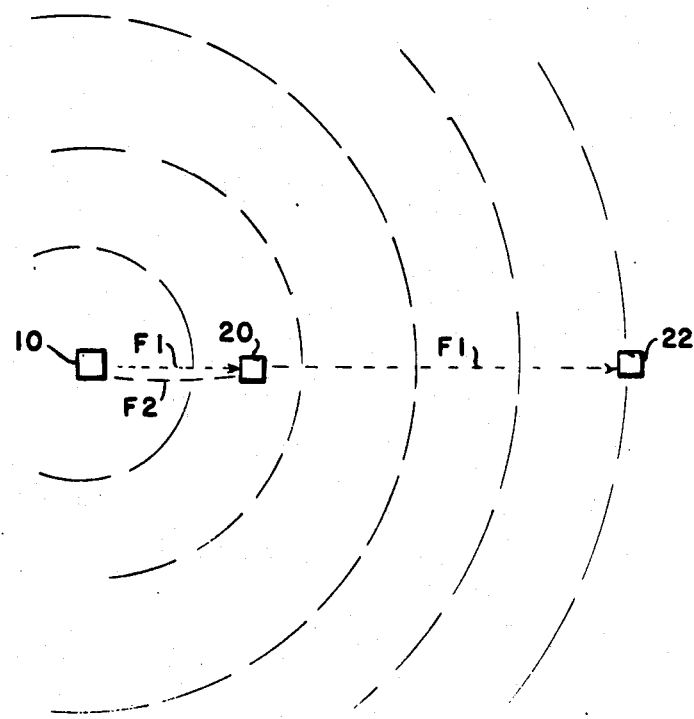
FIG. 2 is a schematic diagram illustrating typical operation of the monitor and alarm in the field.

FIG. 2 schematically illustrates a method of operation of the monitor and alarm system. In FIG. 2 the base unit 10 may be located, for example, in a convalescent hospital for ambulatory patients who must take short walks from the hospital. The mobile unit 20 may be carried by a first patient who may stroll within only a 150 meter radius from the hospital. The threshold circuit 26 in that mobile unit 20 is therefore adjusted to a value corresponding to a 150 meter distance so that the transmitter 28 will generate its second electromagnetic output signal at any distance exceeding that distance. A second mobile unit 22 may be carried by a second patient who is permitted to walk perhaps 500 meters from the base unit. Therefore, if it is assumed that both the first and second patients walk together, the mobile unit carried by the first patient will sound a base unit alarm upon its exceeding the 150 meter range whereas the second patient's mobile unit will permit a much further ranging. The visual display or alarm at the base unit indicating that a patient has crossed the prescribed boundary will then cause an attendant to fetch the errant patient.

Figure 3:
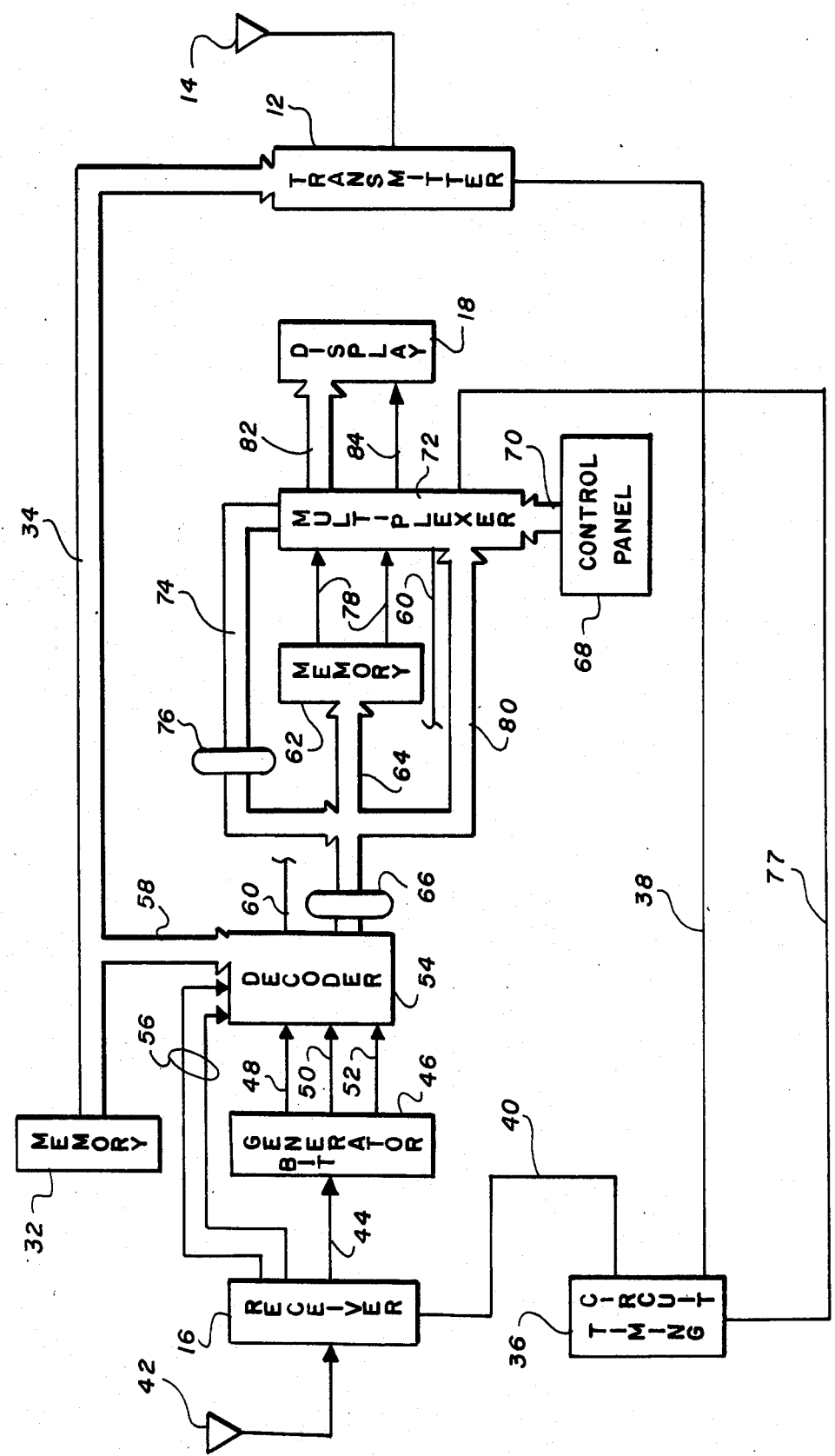
FIG. 3 is a block circuit diagram of a base unit.

In FIG. 3, a base unit has a transmitter 12, connected to an omnidirectional antenna 14 and producing a first electromagnetic output signal at a first frequency. Transmitter 12 modulates a base unit identification code as part of the output signal. The code is stored in a reference code memory 32 and is delivered to transmitter 12 on a code bus 34. Memory 32 is typically a four-pin switch set to one of sixteen different settings. A timing circuit 36 connects to transmitter 12 via an enable line 38 and produces a transmit enable signal for allowing transmitter 12 to produce the first signal and transmit the output signal in all directions from antenna 14. As already noted above, transmitter 12 may be operated in either a continuous or intermittent manner.

The base unit also has a receiver 16 connected to a receiving antenna 42. Receiver 16 receives a signal output, if any, by one of a plurality of mobile units at a second frequency. Preferably, the frequency of the received second signal is equal to the frequency of the transmitted first signal. Timing circuit 36 also connects to receiver 16 via an enable line 40 and produces a receive enable signal allowing receiver 16 to receive signals from mobile units. When operated in an intermittent manner, timing circuit 36 alternately allows transmitter 12 and receiver 16 to operate, switching back and forth between the transmitter and receiver. When operated in a continuous manner, timing circuit 36 enables both transmitter 12 and receiver 16 simultaneously. In order to prevent possible confusion in identifying received signals when both transmitter 12 and receiver 16 are simultaneously operated, the base unit identification code is preferably set to zero. When transmitter 12 and receiver 16 are operated alternately in an intermittent manner, the base unit identification code may be set to any of the possible settings.

Receiver 16 demodulates the received electromagnetic second signal, if any, and the resulting serial code signal 44 is differentially amplified with respect to a synchronization signal in a bit generator 46 to generate a serial data signal. Bit generator 46 is connected to a decoder 54 via a data line 48 carrying this serial data signal, a synchronization line 50 and a clock line 52. Decoder 54 also receives signals directly from receiver 16 via two channels 56. Decoder 54 compares these signals on channels 56 with the base unit identification code. Exclusive-OR gates in decoder 54 connected to both reference code memory 32 via a bus 58 and to channels 56 may be used for this comparison. The result of this comparison indicates whether the received electromagnetic second signal from antenna 42 is a "good" signal from a mobile unit or is instead an echo of the transmitted first signal from transmitter 12. Decoder 54 also typically includes a shift register which converts the serial data signal on line 48 to a parallel code signal of an equal number of bits containing the mobile unit identification code.

The parallel code signal generated by decoder 54 is stored in a memory 62. Decoder 54 connects to memory 62 via an address bus 64 and a buffer 66. Memory 62 is typically a static RAM chip and keeps track of the current status of the various mobile units, i.e. whether a parallel code signal for a mobile unit has been received.

The base unit has a control panel 68 which may include switches for on or off, automatic or manual operation, run or load, clear memory, and enter active mobile units. Other switches or buttons for similar functions may also be included. Control panel 68 communicates via a control bus 70 with a multiplexer 72. Multiplexer 72 likewise communicates with memory 62 via a second control bus 74 and a buffer 76 for accessing information stored in memory 62. In response to control signals on control bus 70, multiplexer 72 may enable the timing circuit 36 via timing enable line 77, transfer a mobile unit identification code in buffer 66 to memory 62 or drive a display or alarm 18. Control lines, represented by lines 78, between memory 62 and multiplexer 72 acknowledge that a code has been received, that it is ready for another command and the like. Identification code information may be transferred on command from memory 62 to display 18 via data display buses 82. Display 18 which is typically an LED display, indicates in sequence the mobile unit or units, if any, which are out of range.

Figure 4:
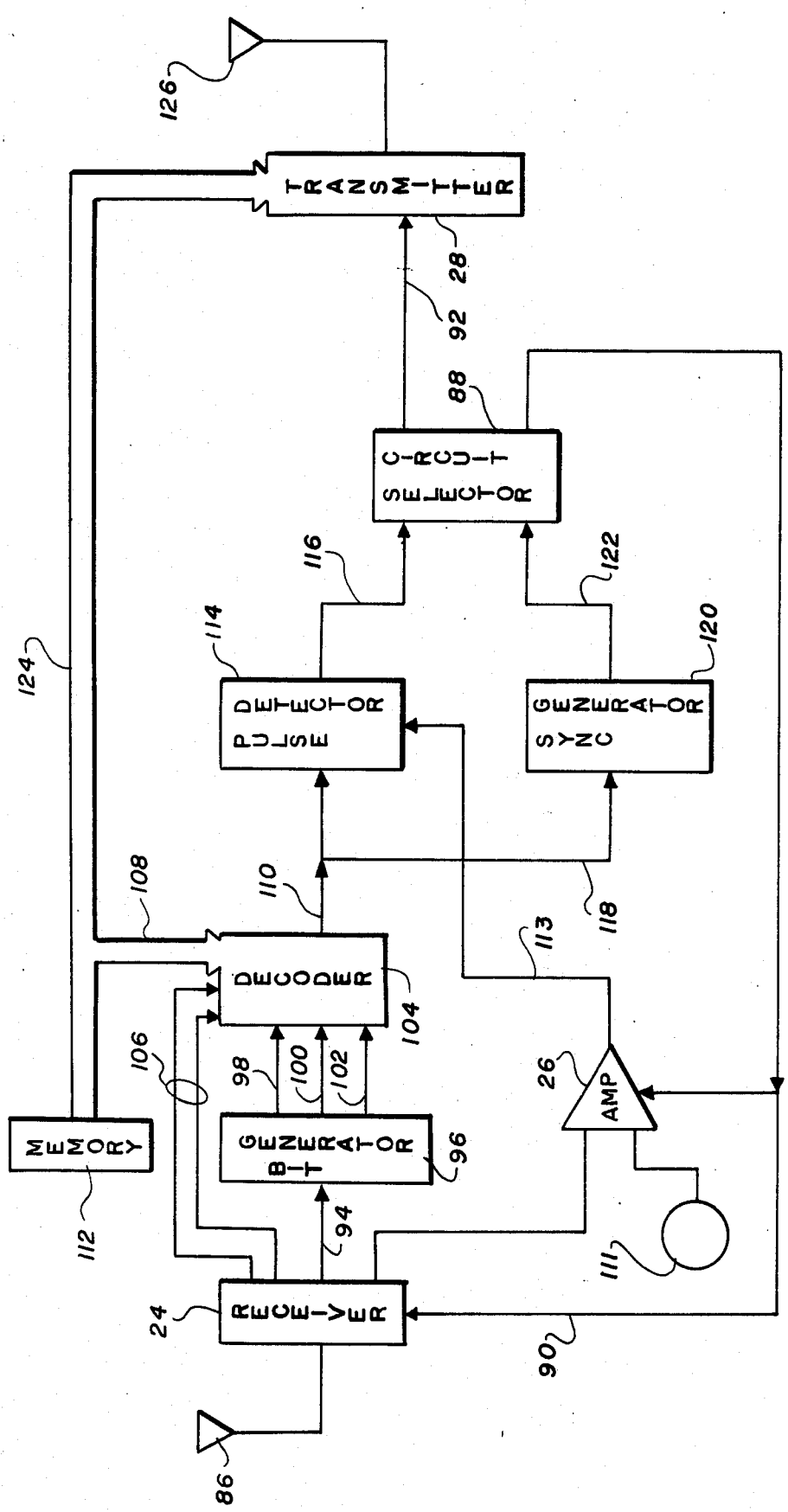
FIG. 4 is a block circuit diagram of a mobile unit.

In FIG. 4, a mobile unit has a receiver 24 connected to a receive antenna 86 for receiving the coded first electromagnetic signal from the base unit. A selector circuit 88 connects to receiver 24 via an enable line 90 and produces a receive enable signal allowing receiver 24 to receive signals from the base unit. Selector 88 also connects to a transmitter 28 via second enable line 92 for enabling the transmitter 28. Normally, when the mobile unit is not out of range, the receiver 24 is continually on and the transmitter is off. Whenever the mobile unit moves out of range, selector 88 enables the transmitter, and typically also disables the receiver.

Receiver 24 connects to a bit generator 96 via a serial code line 94 and to a decoder 104 via channels 106. Bit generator 96 also connects to decoder 104 via a data line 98, synchronization line 100 and a clock line 102. Receiver 24, bit generator 96 and decoder 104 work in the same manner as receiver 16, bit generator 46 and decoder 54 of the base unit described above. Decoder 104 compares a signal from receiver 24 on channels 106 with a base unit identification code stored in a memory 112 to determine whether the electromagnetic signal being received is indeed a "good code" from the base unit and not from some other mobile unit. Memory 112 communicates with decoder 104 via a code bus 108. The result of the comparison is output from decoder 104 onto a code line 110.

Receiver 24 also connects to threshold detector 26. Threshold detector 26 is typically one or more operational amplifiers whose amplifications can be varied. Increasing the amplification lowers the threshold of detection and increases the distance from base unit over which the mobile unit can be still in range. Decreasing the amplification, reduces the range of the mobile unit. The resulting electrical signal, if the mobile unit is in range, or absence of a signal, if the mobile unit is out of range, is transmitted over an in-range line 113 to a pulse detector 114. Code line 110 also connects to pulse detector 114.

Pulse detector 114 produces a signal indicative of a good reception by receiver 24 when both code line 110 transmits a signal indicative of a good code and when in-range line 113 transmits an in-range signal. If either code line 110 indicates that the received signal is not from the base unit or in-range line 113 indicates that the mobile unit is out of range from the base unit, pulse detector 114 produces a signal indicative of a poor reception by receiver 24. Pulse detector 114 is typically a simple logic gate. Pulse detector 114 connects at its output to selector 88 via a pulse detection line 116.

A sync generator 120 receives a signal on a second code line 118 from decoder 104. The output of sync generator 120 connects to selector 88 via a sinc line 122. Sync generator typically comprises a commercially available timer IC generating pulses synchronized with the output of decoder 104. Selector 88 enables transmitter 28 whenever sync generator 120 transmits a pulse to selector 88 and pulse detector 114 transmits a signal indicative of poor reception. Otherwise, selector 88 enables receiver 24.

Transmitter 28 transmits an electromagnetic second signal over antenna 126 having a frequency which is preferably equal to the frequency of the first signal transmitted by the base unit. Transmitter 28 communicates via a bus 124 with memory 112. Memory 112, in addition to storing a base unit identification code for comparison in decoder 104 also stores a mobile unit identification code particular to the mobile unit. Memory 112 may, for example, be an 8-pin switch with four of the switches set to the positions for the base unit identification code and the four remaining switch pins set to positions for the mobile unit identification code. Transmitter 28 modulates the mobile unit identification code on the signal transmitted by antenna 126. Thus, whenever the mobile unit is out of range from the base unit, the mobile unit transmits its identification code to the base unit where it is detected and displayed as described above.

While the invention has been described for use in a rest home and for ambulatory patients, it is clear that it may be used for controlling children in a playground or at a picnic. The alarm may also be valuable for training hunting dogs or other animals by substituting the optional alarm 30 in the mobile unit for a unit that gives the animal a gentle electrical shock if it extends its range beyond a prescribed amount.

I claim:

1. An out-of-range alarm system for generating an alarm whenever a mobile unit in the system extends beyond a prescribed limit from a base unit, said alarm system comprising,
a fixed base unit having therein a transmitter for generating an omnidirectional first signal, said output signal emanating from a single source, a receiver for detecting a second signal, said second signal having an identification code indicative of a mobile unit, a decoder for reading and identifying said identification code, and an alarm associated with said receiver for producing an alarm signal upon the detection of said second signal, and
at least one mobile unit having a receiver for detecting said first signal transmitted by said base unit, threshold circuitry coupled to said receiver for generating a threshold output signal upon a failure of said mobile unit receiver to detect said first signal at a predetermined signal strength, and a transmitter coupled to said threshold circuitry for generating a second signal in response to said threshold output signal, said output signal having an identification code indicative of said mobile unit to the fixed base unit.

2. The alarm system of claim 1 further including adjustment means associated with said threshold circuitry for adjusting said threshold output signal to correspond to prescribed distance of said mobile unit from said base unit.

3. The alarm system of claim 2 wherein said first signal is a continuous fixed frequency signal, and wherein said second signal has a frequency which is equal to the frequency of the first signal.

4. The alarm system of claim 3 wherein said first and second signals are shortwave electromagnetic signals modulated with identification codes indicative of said base unit and said mobile unit respectively.

5. The alarm system of claim 4 wherein said first and second electromagnetic signals are VHF radio signals modulated with identification codes.

6. The alarm system of claim 3 wherein said first and second signals are ultrasonic signals.

7. The alarm system of claim 2 further including an alarm within said mobile unit and responsive to activation of its transmitter.

8. The alarm system of claim 1 wherein said alarm of base unit produces a visual display alarm signal indicative of said mobile unit corresponding to said second signal.

9. A method for alarming a base unit that a mobile unit associated with said base unit has exceeded a predetermined distance from said base unit, said method comprising the steps of:
transmitting from a single, fixed base unit a first signal to a receiver in the mobile unit;
adjusting an output signal from said mobile unit receiver in a threshold circuit that generates a threshold output signal only upon a failure of said receiver to detect said first signal at a signal strength as determined by the adjustment of said threshold circuit;
transmitting from said mobile unit a second signal in response to said threshold output signal, said second signal being modulated with an identification code indicative of said mobile unit, and receiving in said base unit said second signal and generating an alarm in response thereto.

10. The method of claim 9 further including the step of:
providing in said mobile unit an alarm triggered upon the activation of said mobile unit transmitter.

11. The method of claim 9 wherein said second signal has a frequency equal to a frequency of said first signal.

12. The method of claim 9 wherein said first signal is modulated with a base unit identification code indicative of said base unit.

13. An out-of-range alarm system for generating an alarm whenever a mobile unit in the system extends beyond a prescribed limit from a base unit, said alarm system comprising,
a base unit including means for generating an omnidirectional first signal, means for detecting a second signal modulated with a mobile unit identification code indicative of a particular mobile unit, means for identifying said particular mobile unit indicated by said code, and an alarm operative to produce an alarm signal upon the detection of said second signal, and
at least one mobile unit including means for detecting said first signal, threshold circuitry responsive to said detected first signal and operative to generate a threshold output signal when said first signal falls below a predetermined signal strength, and means coupled to said threshold circuitry for generating said second signal in response to said threshold output siqnal.

14. The alarm system of olaim 13 further including adjustment means associated with said threshold circuitry for adjusting said threshold output signal to correspond to prescribed distance of said mobile unit from said base unit.

15. The alarm system of claim 14 wherein said first signal is a continuous fixed frequency signal, and wherein said second signal is a continuous fixed frequency signal whose frequency is equal to said first frequency.

16. The alarm system of claim 13 wherein said first signal is modulated with a base unit identification code, said at least one mobile unit further including means for comparing an identification code on a detected signal with said base unit identification code.

17. The alarm system of claim 13 wherein said alarm signal comprises a visual display identifying said particular mobile unit.

* * * * *